United States Patent
Webb

(10) Patent No.: US 11,284,152 B2
(45) Date of Patent: *Mar. 22, 2022

(54) COMPUTING SYSTEM WITH TIMING PREDICTION AND MEDIA PROGRAM RETRIEVAL AND OUTPUT FEATURE

(71) Applicant: Sports Direct, Inc., Halifax (CA)

(72) Inventor: Clint Alan Webb, Halifax (CA)

(73) Assignee: Sports Direct, Inc., Halifax (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/895,599

(22) Filed: Jun. 8, 2020

(65) Prior Publication Data

US 2020/0304872 A1 Sep. 24, 2020

Related U.S. Application Data

(63) Continuation of application No. 16/175,446, filed on Oct. 30, 2018, now Pat. No. 10,681,415, which is a
(Continued)

(51) Int. Cl.
*H04N 21/458* (2011.01)
*H04N 21/482* (2011.01)
(Continued)

(52) U.S. Cl.
CPC ..... *H04N 21/4583* (2013.01); *H04N 21/4345* (2013.01); *H04N 21/458* (2013.01);
(Continued)

(58) Field of Classification Search
CPC ............. H04N 21/4583; H04N 21/458; H04N 21/482; H04N 21/6405
See application file for complete search history.

(56) References Cited

U.S. PATENT DOCUMENTS

| 6,405,372 | B1 | 6/2002 | Kim et al. |
| 6,968,566 | B1 | 11/2005 | Entwistle |

(Continued)

FOREIGN PATENT DOCUMENTS

| EP | 1763236 | 3/2007 |
| EP | 2398250 | 12/2011 |
| WO | 2007078846 | 7/2007 |

OTHER PUBLICATIONS

AT&T, "DVR not extending time if the show is going longer?", retrieved online on Aug. 8, 2017, at https://forums.att.com/t5/U-verse-TV-DVR-Receivers/DVR-not-extending-time-if-the-show-is-going-longer/td-p/3406899, (Jan. 21, 2013), 8 pages.
(Continued)

*Primary Examiner* — Chenea Davis
(74) *Attorney, Agent, or Firm* — Hanley, Flight & Zimmerman, LLC

(57) ABSTRACT

In one aspect, an example system includes a first distributor to distribute a portion of first media on a channel from a first media source scheduled to end at a scheduled end-time, a receiver to determine a predicted end-time for the first media, the determining including obtaining data representing a first state of the first media, obtaining data representing a second state of a past event corresponding to a subject of the first media, and determining the predicted end-time based on a comparison of the first and second states, and a second distributor different from the first distributor to distribute a portion of second media from a second media source other than the channel when the predicted end-time is after the scheduled end-time wherein the second media is to start at a scheduled start-time, and cause the receiver to output the portion of the second media after the scheduled start-time.

20 Claims, 3 Drawing Sheets

Related U.S. Application Data continuation of application No. 15/616,551, filed on Jun. 7, 2017, now Pat. No. 10,149,010.

(51) Int. Cl.
    *H04N 21/6405*  (2011.01)
    *H04N 21/462*   (2011.01)
    *H04N 21/434*   (2011.01)

(52) U.S. Cl.
    CPC ....... *H04N 21/4622* (2013.01); *H04N 21/482* (2013.01); *H04N 21/6405* (2013.01)

(56) References Cited

U.S. PATENT DOCUMENTS

| | | | |
|---|---|---|---|
| 7,019,926 | B2 | 5/2006 | Chainer et al. |
| 7,080,396 | B2 | 7/2006 | Gong |
| 7,356,246 | B1 | 4/2008 | Kobb |
| 7,600,246 | B2 | 10/2009 | Taylor et al. |
| 7,882,520 | B2 | 2/2011 | Beach et al. |
| 7,941,820 | B2 | 5/2011 | Ahn |
| 8,270,818 | B2 | 9/2012 | Dolph |
| 8,336,069 | B1 | 12/2012 | Kamen et al. |
| 8,380,050 | B2 | 2/2013 | Kummer |
| 8,401,366 | B2 | 3/2013 | Barton |
| 8,428,436 | B2 | 4/2013 | Howarter et al. |
| 8,726,314 | B2 | 5/2014 | Downey et al. |
| 9,167,196 | B2 | 10/2015 | Woods |
| 9,307,278 | B2 | 4/2016 | Ellis et al. |
| 9,351,043 | B2 | 5/2016 | Casey et al. |
| 9,485,536 | B1 | 11/2016 | Chaudhry |
| 10,149,010 | B1 | 12/2018 | Webb |
| 10,681,415 | B2 | 6/2020 | Webb |
| 2002/0010922 | A1 | 1/2002 | Darin et al. |
| 2003/0028882 | A1 | 2/2003 | Davis et al. |
| 2005/0114340 | A1 | 5/2005 | Huslak et al. |
| 2006/0064716 | A1 | 3/2006 | Sull et al. |
| 2006/0064721 | A1 | 3/2006 | Del Val et al. |
| 2006/0174310 | A1 | 8/2006 | Lee et al. |
| 2008/0112686 | A1 | 5/2008 | Chen et al. |
| 2009/0046987 | A1 | 2/2009 | White et al. |
| 2010/0220976 | A1 | 9/2010 | Ellis et al. |
| 2010/0316355 | A1 | 12/2010 | Bumgardner et al. |
| 2011/0162008 | A1 | 6/2011 | Aldrey et al. |
| 2012/0036537 | A1 | 2/2012 | Klappert et al. |
| 2012/0240145 | A1 | 9/2012 | Day |
| 2013/0239153 | A1 | 9/2013 | Deakin et al. |
| 2014/0331260 | A1 | 11/2014 | Gratton |
| 2014/0337893 | A1 | 11/2014 | Roe |
| 2016/0080822 | A1 | 3/2016 | Arling et al. |
| 2016/0234561 | A1 | 8/2016 | Chai et al. |
| 2016/0282132 | A1 | 9/2016 | Bostick et al. |
| 2016/0309227 | A1 | 10/2016 | Casagrande |
| 2017/0098377 | A1 | 4/2017 | Marco et al. |
| 2018/0359525 | A1 | 12/2018 | Webb |
| 2018/0359527 | A1 | 12/2018 | Webb |
| 2019/0069026 | A1 | 2/2019 | Webb |

OTHER PUBLICATIONS

Jeff Baumgartner, "X1 Adds 'Auto Extend' DVR Option," retrieved online from Multichannel News on Aug. 8, 2017, at http://www.multichannel.com/news/content/x1-adds-auto-extend-dvr-option/392682, (May 31, 2016), 1 page.

Josh Levin, "Why Do Americans Have the Worst DVRS?," retrieved online from Slate on Aug. 8, 2017, retrieved from http://www.slate.com/articles/arts/culturebox/2013/06/accurate_recording_the_one_amazing_feature_that_makes_european_dvrs_so_much.html, (Jun. 21, 2013), 4 pages.

United States Patent and Trademark Office, "Non-final Office Action," issued in connection with U.S. Appl. No. 15/616,551, dated Jan. 11, 2018, 25 pages.

United States Patent and Trademark Office, "Non-final Office Action," issued in connection with U.S. Appl. No. 15/616,473, dated May 2, 2018, 8 pages.

United States Patent and Trademark Office, "Notice of Allowance," issued in connection with U.S. Appl. No. 15/616,551, dated Jul. 20, 2018, 8 pages.

United States Patent and Trademark Office, "Final Office Action," issued in connection with U.S. Appl. No. 15/616,473, dated Nov. 21, 2018, 8 pages.

United States Patent and Trademark Office, "Advisory Action," issued in connection with U.S. Appl. No. 15/616,473, dated Feb. 20, 2019, 4 pages.

United States Patent and Trademark Office, "Non-Final Office Action," issued in connection with U.S. Appl. No. 15/616,473, dated May 16, 2019, 8 pages.

United States Patent and Trademark Office, "Final Office Action," dated Oct. 31, 2019 in connection with U.S. Appl. No. 15/616,473 (10 pages).

United States Patent and Trademark Office, "Office Action," dated Jul. 10, 2019 in connection with U.S. Appl. No. 16/175,446 (10 pages).

United States Patent and Trademark Office, "Final Office Action," dated Oct. 31, 2019 in connection with U.S. Appl. No. 16/175,446, dated Oct. 31, 2019, 9 pages.

United States Patent and Trademark Office, "Notice of Allowance," dated Feb. 5, 2020, in connection with U.S. Appl. No. 16/175,446 (10 pages).

United States Patent and Trademark Office, "Notice of Allowance," dated Mar. 11, 2020, in connection with U.S. Appl. No. 15/616,473 (9 pages).

United States Patent and Trademark Office, "Non-Final Office Action," issued in connection with U.S. Appl. No. 16/937,283, dated Jun. 8, 2021, 13 pages.

United States Patent and Trademark Office, "Notice of Allowance," issued in connection with U.S. Appl. No. 15/616,551, dated Sep. 14, 2018, 6 pages.

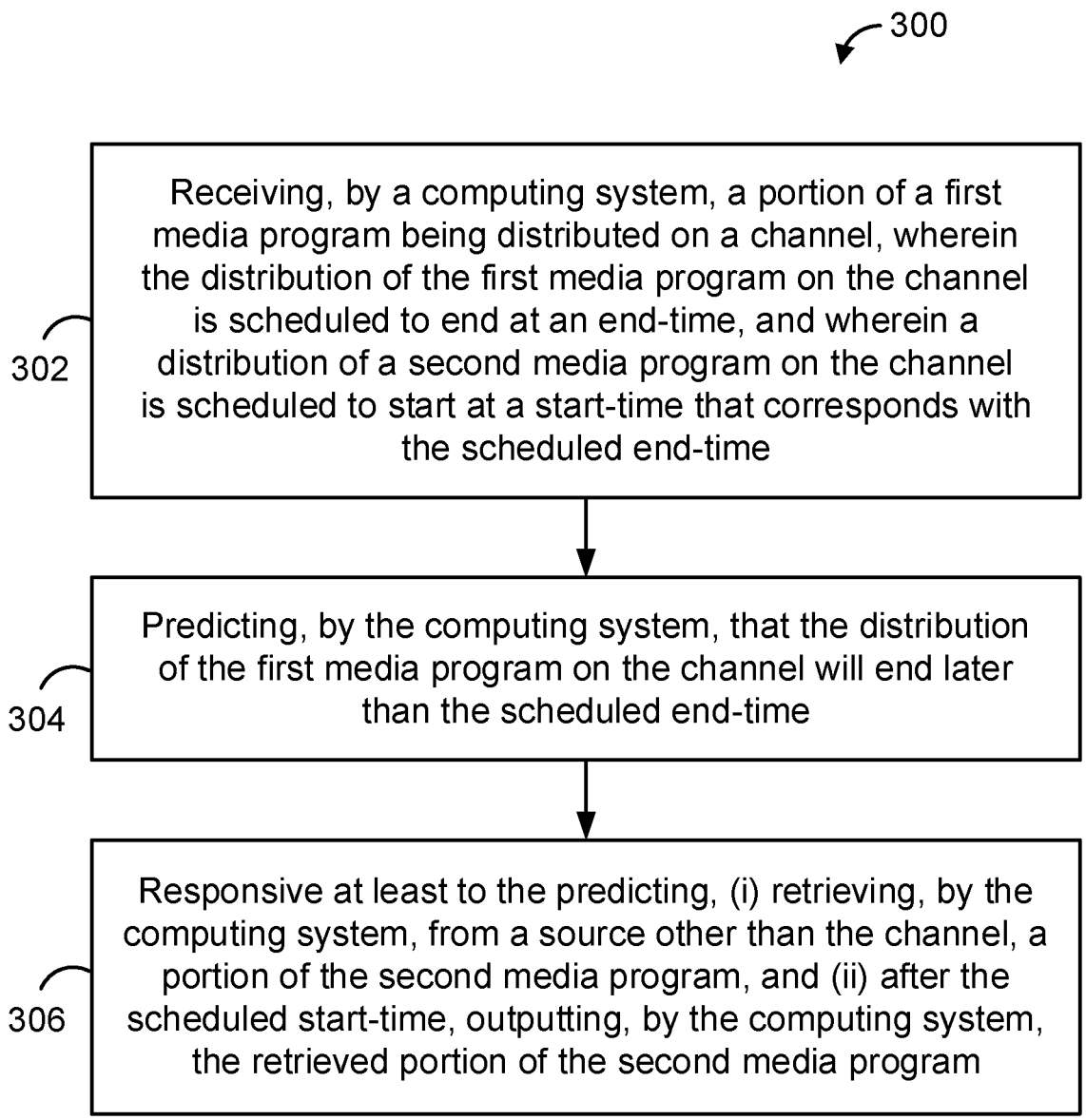

COMPUTING SYSTEM WITH TIMING PREDICTION AND MEDIA PROGRAM RETRIEVAL AND OUTPUT FEATURE

RELATED APPLICATION

This patent arises from a continuation of U.S. patent application Ser. No. 16/175,446, (Now U.S. Pat. No. 10,681,415) which was filed on Oct. 30, 2018, which arises from a continuation of U.S. patent application Ser. No. 15/616,551, (Now U.S. Pat. No. 10,149,010) which was filed on Jun. 7, 2017. U.S. patent application Ser. No. 16/175,446 and U.S. patent application Ser. No. 15/616,551 are hereby incorporated herein by reference in their entireties. Priority to U.S. patent application Ser. No. 16/175,446 and U.S. patent application Ser. No. 15/616,551 is hereby claimed.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) receiving, by a computing system, a portion of a first media program being distributed on a channel, wherein the distribution of the first media program on the channel is scheduled to end at an end-time, and wherein a distribution of a second media program on the channel is scheduled to start at a start-time that corresponds with the scheduled end-time; (ii) predicting, by the computing system, that the distribution of the first media program on the channel will end later than the scheduled end-time; and (iii) responsive at least to the predicting, (a) retrieving, by the computing system, from a source other than the channel, a portion of the second media program, and (b) after the scheduled start-time, outputting, by the computing system, the retrieved portion of the second media program.

In another aspect, an example non-transitory computer-readable medium is disclosed. The computer-readable medium has stored thereon program instructions that upon execution by a processor, cause performance of a set of acts including (i) receiving, by a computing system, a portion of a first media program being distributed on a channel, wherein the distribution of the first media program on the channel is scheduled to end at an end-time, and wherein a distribution of a second media program on the channel is scheduled to start at a start-time that corresponds with the scheduled end-time; (ii) predicting, by the computing system, that the distribution of the first media program on the channel will end later than the scheduled end-time; and (iii) responsive at least to the predicting, (a) retrieving, by the computing system, from a source other than the channel, a portion of the second media program, and (b) after the scheduled start-time, outputting, by the computing system, the retrieved portion of the second media program.

In another aspect, an example computing system is disclosed. The computing system is configured for performing a set of acts including (i) receiving, by the computing system, a portion of a first media program being distributed on a channel, wherein the distribution of the first media program on the channel is scheduled to end at an end-time, and wherein a distribution of a second media program on the channel is scheduled to start at a start-time that corresponds with the scheduled end-time; (ii) predicting, by the computing system, that the distribution of the first media program on the channel will end later than the scheduled end-time; and (iii) responsive at least to the predicting, (a) retrieving, by the computing system, from a source other than the channel, a portion of the second media program, and (b) after the scheduled start-time, outputting, by the computing system, the retrieved portion of the second media program.

BRIEF DESCRIPTION OF THE DRAWINGS

FIG. 3 is a flow chart of an example method.

DETAILED DESCRIPTION

I. Overview

Figure 1:
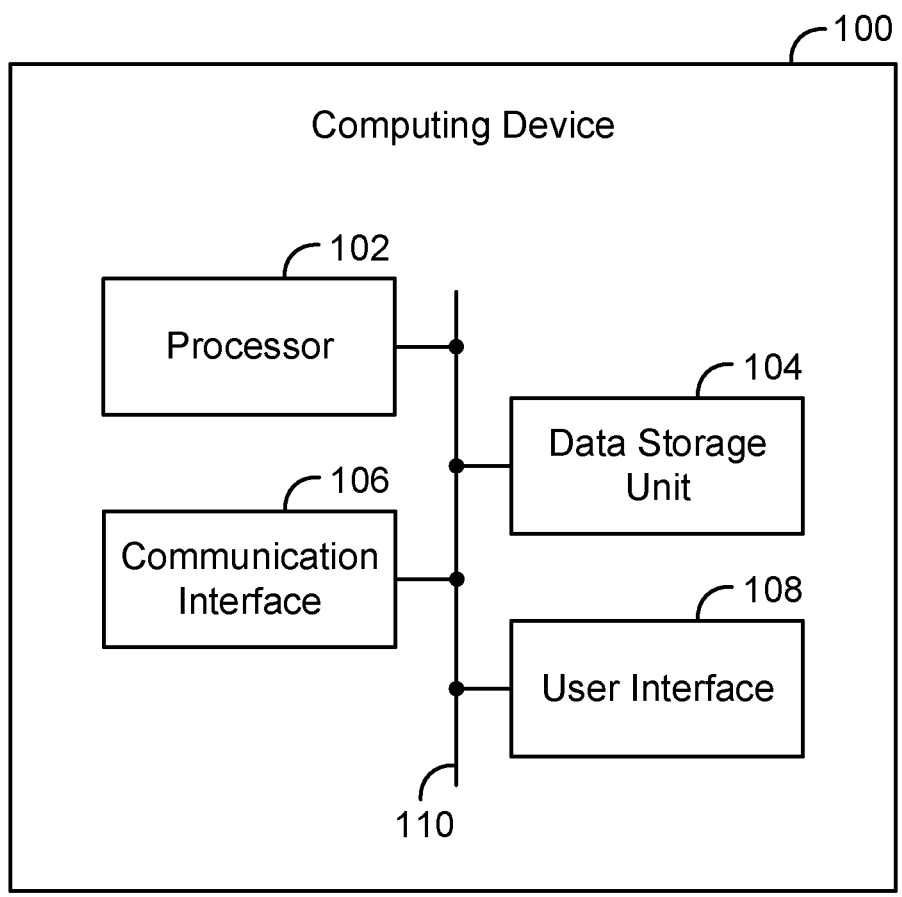
FIG. 1 is a simplified block diagram of an example computing device.

A media system can perform various acts and/or functions related to the distribution and/or presentation of media content (e.g., audio content and/or video content). The media system can include various components, such as a media content source, a media content distributor, a set-top box receiver, and a media presentation device. The source and the distributor can each take various forms. For example, the source can be a broadcaster and the distributor can be a multi-channel distributor (e.g., a cable provider). The receiver and the media presentation device can also take various forms. For example, the receiver can be a cable receiver and the media presentation device can be a television.

With this arrangement, the source can deliver media content to the distributor for distribution to the receiver, and the distributor can distribute the media content to the receiver on a discrete channel (e.g., on a particular frequency). The receiver can then respond to user input or one or more other trigger events by tuning to a selected channel and transmitting to the media presentation device the media content that is arriving on the selected channel. The media presentation device can then receive and present the media content.

In some cases, the distributor can distribute media content based on a distribution schedule, which can specify which media programs are scheduled for distribution, when they are scheduled for distribution, and on what channels they are scheduled to be distributed on. In some cases, a distribution schedule can specify that a distributor is scheduled to distribute a first media program, and is further scheduled to distribute a second media program immediately after or soon after distributing the first media program. As such, a scheduled end-time of the first media program can correspond with a scheduled start-time of the second media program.

In the case where the distributor distributes the first and second media programs according to the distribution schedule, the media presentation device can receive and present the media programs based on the schedule. However, for various reasons, the distributor may not distribute the media programs according to the schedule. Thus, the media presentation device may not receive and present the media programs based on the schedule.

To illustrate how this can happen, assume that the first media program is a media program covering a sporting event, and that the distribution of the first media program is a live broadcast. Further, assume that the sporting event, the first media program, and the distribution of the first media program run ten minutes longer than expected. Given this, the distributor can distribute the first media program until an end time that is ten minutes beyond the scheduled end-time, and can then transition to distributing the second media program (at a start time that is ten minutes later than the scheduled start time).

In this scenario, if the end-user of the media presentation device wants to watch the ten minute overrun portion of the first media program, the end-user can do so. However, if the end-user instead wants to watch the first ten minutes of the second media program on the media presentation device, the end-user may become frustrated when the media presentation device presents the ten minute overrun portion of the first media program instead. Thus, this particular technical arrangement may present an issue.

However, features of the present disclosure can help address this issue and provide an improvement to the relevant technical field. These features will now be described. As noted above, the distributor can transmit the first media program distributed on the channel to the receiver. As such, the receiver can receive a portion of the first media program being distributed on the channel.

Further, the receiver can predict that the distribution of the first media program on the channel will end later than the scheduled end-time. The receiver can do this in various ways. For example, in the case where the distribution of the first media program is a live broadcast of an event, the receiver can (i) use the distribution schedule to determine the scheduled end-time of the first media program, (ii) receive data representing a state of the event that is a subject of the first media program, (iii) use the received data to predict an end time of the first media program, and (iv) determine that the predicted end-time is later than the determined scheduled end-time.

Responsive at least to the predicting, the receiver can (i) retrieve from a source other than the channel, a portion of the second media program, and (ii) after the scheduled start-time, the receiver can output the retrieved portion of the second media program. In one example, the source other than the channel can be another distributor. For example, in the case where the first distributor is a broadcast-based distributor and the second (other) distributor is an Internet service provider, this can allow the receiver to retrieve the portion of the second media program "over the top" of the broadcast first media program.

Recall the scenario discussed above where the end-user may become frustrated when the media presentation device presents the ten minutes overrun portion of the first media program instead of the first ten minutes of the second media program. As shown with the features discussed above, the media system can address this issue by allowing the end-user to watch the first ten minutes of the second media program despite the distributor distributing a portion of the first media program beyond its scheduled end-time. These and other features and benefits are described in greater detail below.

II. Example Architecture

A. Computing Device

FIG. 1 is a simplified block diagram of an example computing device 100. The computing device 100 can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions included in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet, High-Definition Multimedia Interface (HDMI), or coaxial interface. In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a remote control, a touch-sensitive panel, and/or a microphone, and/or output components such as a display device (which, for example, can be combined with a touch-sensitive panel), a sound speaker, and/or a haptic feedback system.

The computing device 100 can take various forms, such as a server, a workstation terminal, a desktop computer, a laptop, a tablet, a mobile phone, a set-top box receiver, and/or a television.

B. Media System

Figure 2:
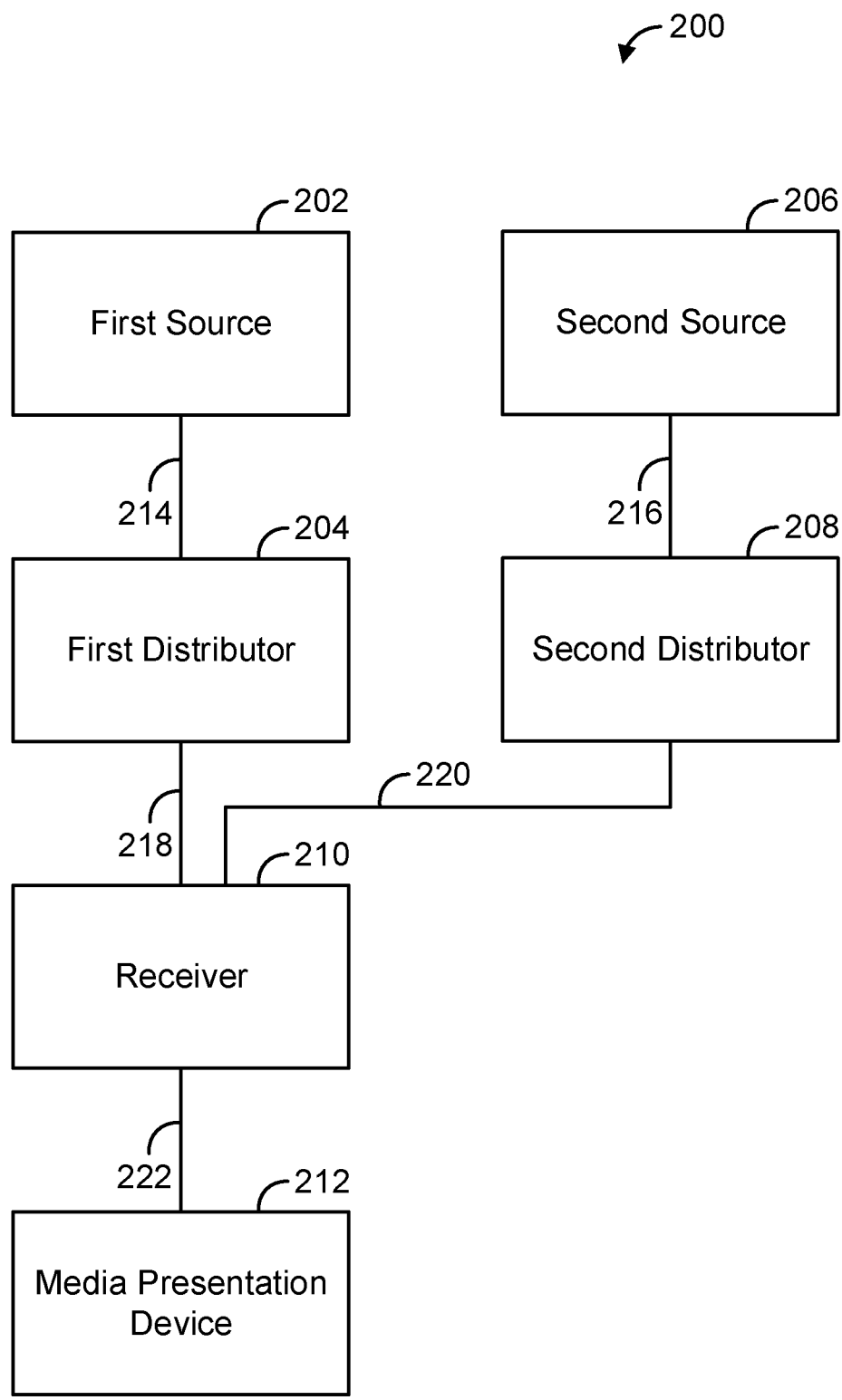
FIG. 2 is a simplified block diagram of an example media system.

FIG. 2 is a simplified block diagram of an example media system 200. The media system 200 can perform various acts and/or functions related to the distribution and/or presentation of media content (e.g., audio content and/or video content), and can be implemented as a computing system. In this disclosure, the term "computing system" means a system that includes at least one computing device. In some instances, a computing system can include one or more other computing systems.

The media system 200 can include various components, such as a first media content source (referred to herein as a "first source") 202, a first media content distributor (referred to herein as a "first distributor") 204, a second media content source (referred to herein as a "second source") 206, a second media content distributor (referred to herein as a "second distributor") 208, a set-top box receiver (referred to herein as a "receiver") 210, and/or a media presentation device 212, each of which can be implemented as a computing system.

The media system 200 can also include a connection mechanism 214, which connects the first source 202 with the first distributor 204; a connection mechanism 216, which connects the second source 206 with the second distributor 208; a connection mechanism 218, which connects the first distributor 204 with the receiver 210; a connection mechanism 220, which connects the second distributor 208 with the receiver 210; and a connection mechanism 222, which connects the receiver 210 with the media presentation device 212. In practice, the media system 200 is likely to include many of some or all of the example components described above, which can allow for many media content sources to provide media content to many media presentation devices.

The first source 202 and the first distributor 204 can each take various forms. For example, the first source 202 can be a broadcaster and/or a web server, and the first distributor 204 can be a multi-channel distributor (e.g., a local content provider, a cable provider, a satellite provider, an over-the-air broadcast provider, and/or a web aggregator) and/or an Internet service provider. Likewise, the second source 206 and the second distributor 208 can take various forms such as the respective examples provided above. In some cases, the first source 202 and the first distributor 204 can be integrated together. Likewise, the second source 206 and the second distributor 208 can be integrated together.

The receiver 210 and the media presentation device 212 can each take various forms as well. For example, the receiver can be a cable receiver, a satellite receiver, an over-the-air broadcast receiver, and/or a streaming media receiver, and the media presentation device 212 can be a television or another display device, or a loudspeaker or another audio device. In some cases, the receiver 210 and the media presentation device 212 can be integrated together.

III. Example Operations

Referring again to FIG. 2, within the media system 200, the first source 202 can transmit media content to the first distributor 204, which can transmit the media content to the receiver 210. The receiver 210 can then transmit the media content to the media presentation device 212, which can present the media content to an end-user using any media presentation technique now known or later discovered.

In one example, the first source 202 can be a national broadcaster, such as ABC, NBC, CBS, FOX, HBO, or CNN, and the first distributor 204 can be a local affiliate or local content provider in a particular designated market area (DMA). Further, the receiver 210 and the media presentation device 212 can be located at a customer's premises, such as a home or business establishment. With this or another arrangement, the first source 202 can deliver media content to the first distributor 204 for distribution to the receiver 210, and the first distributor 204 can distribute the media content to the receiver 210 on a discrete channel (e.g., on a particular frequency). The receiver 210 can then respond to user input or one or more other trigger events by tuning to a selected channel and transmitting to the media presentation device 212 the media content that is arriving on the selected channel. The media presentation device 212 can then receive and present the media content (e.g., by displaying or otherwise presenting the content). For simplicity, with respect to a given portion of media content, this disclosure refers to these and similar types of acts (e.g., delivering or distributing a portion of media content, receiving the portion of media content, and presenting the portion of media content content) as occurring simultaneously. However, it should be appreciated that in practice, various types of transmission or processing delays can occur.

In some cases, the first distributor 204 can distribute media content based on a distribution schedule. In one example, where the first distributor is a broadcast-based distributor, the distribution schedule may be referred to in the industry as a broadcast schedule.

A distribution schedule can specify which media programs are scheduled for distribution, when they are scheduled for distribution, and on what channels they are scheduled to be distributed on. For instance, a distribution schedule can specify that the first source 202 is scheduled to start distributing a given media program on a given channel at a scheduled start-time and is scheduled to stop distributing that media program on that channel at a scheduled end-time. In some cases, a media program can include commercials or other content as part of the media program.

In some cases, a distribution schedule can specify that a media content distributor is scheduled to distribute a first media program, and is further scheduled to distribute a second media program immediately after or soon after distributing the first media program. As such, the scheduled end-time of the first media program can correspond with the scheduled start-time of the second media program. In practice, the scheduled end-time of the first media program can be proximate to the scheduled start-time of the second media program, and can represent the transition point between the distribution of the first media program and the distribution of the second media program.

To illustrate some of these concepts, consider an example distribution schedule that specifies that the first distributor 204 is scheduled to start distributing a first media program on a channel at a scheduled start-time of 08:00:00 (in hours::minutes::seconds format, and according to a 24-hour clock), and is scheduled to stop distributing the first media program at a scheduled end-time of 08:29:59. The schedule further specifies that the first distributor 204 is scheduled to start distributing a second media program on the same channel at a scheduled start-time of 08:30:00, and is scheduled to stop distributing the second media program at a scheduled end-time of 08:59:59. Thus, the scheduled end-time of the first media program corresponds with the scheduled start-time of the second media program. In some examples, there could be commercials or other content separating the first and second media programs, but even in this case, the scheduled end-time of the first media program can correspond with the scheduled start-time of the second media program.

In the case where the first distributor 204 distributes the first and second media programs according to the distribution schedule, the media presentation device 212 can receive and present the media programs based on the schedule. However, for various reasons, the first distributor 204 may not distribute the media programs according to the schedule. Thus, the media presentation device 212 may not receive and present the media programs based on the schedule.

To illustrate how this can happen, assume that the first media program is a media program covering a sporting event, and that the distribution of the first media program is a live broadcast. Further, assume that the sporting event, the first media program, and the distribution of the first media program run ten minutes longer than expected. Given this, the first distributor 204 can distribute the first media program until an end time that is ten minutes beyond the scheduled end-time (until 08:39:59), and can then transition to distributing the second media program (at a start time that is ten minutes later than the scheduled start time). As such, the media presentation device 212 can present the first media program until 08:39:59, and can then transition to presenting the second media program thereafter.

In this scenario, if the end-user of the media presentation device 212 wants to watch the ten minute overrun portion of the first media program, the end-user can do so. However, if the end-user instead wants to watch the first ten minutes of the second media program on the media presentation device 212, the end-user may become frustrated when the media presentation device 212 presents the ten minute overrun portion of the first media program instead. Thus, this particular technical arrangement may present an issue.

However, features of the present disclosure can help address this issue and provide an improvement to the relevant technical field (i.e., the field of media content distribution and presentation technology). These features will now be described. As noted above, the first distributor 204 can transmit the first media program distributed on the channel to the receiver 210. As such, the receiver 210 can receive a portion (i.e., some or all) of the first media program being distributed on the channel.

Further, the receiver 210 can predict that the distribution of the first media program on the channel will end later than the scheduled end-time. The receiver 210 can do this in various ways. For example, in the case where the distribution of the first media program is a live broadcast of an event, the receiver 210 can (i) use the distribution schedule to determine the scheduled end-time of the first media program, (ii) receive data representing a state of the event that is a subject of the first media program, (iii) use the received data to predict an end time of the first media program, and (iv) determine that the predicted end-time is later than the determined scheduled end-time.

The receiver 210 can obtain the distribution schedule in various ways. In one example, the receiver 210 can retrieve the schedule (perhaps in the form of an electronic program guide (EPG)) from another entity, such as the first distributor 204.

As noted above, the receiver 210 can receive data representing a state of the event that is the subject of the first media program. The receiver 210 can do this in various ways. For example, the receiver 210 can retrieve this data from another entity, such as server.

Further, as noted above, the receiver 210 can use the received data to predict an end time of the first media program. In one example, the receiver 210 can use the received data to predict a timing attribute of the distribution, and based on the predicted timing attribute, the receiver 210 can predict the end time of the first media program. For instance, the predicted timing-attribute can be an indication of a total duration of the event or a duration remaining in the event. In another example, the predicted timing-attribute can be an indication that the event is anticipated to extend beyond a predetermined time.

In some cases, the receiver 210 can determine the predicted end-time of the distribution as the same time as the predicted end-time of the event. In other cases, the receiver 210 can determine the predicted end-time of the distribution as the predicted end-time of the event plus some amount of additional time (e.g., two minutes) for safe measure.

In some cases, the receiver 210 can receive data corresponding to a similar past event. For example, where the event is a sporting event that includes a game, the past event can be a game that occurred under similar circumstances in the past, such as with the same or similar participants, score, or game-clock time. For instance, where the event includes a baseball game between two teams, the data corresponding to the similar past event can include data corresponding to a past baseball game in which the two teams played, a past baseball game having the same score in the same inning, or a past baseball game having one or more other similarities to the current baseball game.

As such, the receiver 210 can predict the timing attribute of the distribution based on the received data representing the state of the event, and the received data corresponding to the past event. For example, the receiver 210 can compare the data representing a state of the past event to the retrieved data representing the state of the event, and based on that comparison determine a predicted end-time for the event. As noted above, the receiver 210 can then determine that the predicted end-time is later than the determined scheduled end-time.

In some cases, a server or another entity can predict that the distribution of the first media program on the channel will end later than the scheduled end-time, and can transmit a message indicating this to the receiver 210. As such, the receiver 210 can receive this message and can predict that the distribution of the first media program on the channel will end later than the scheduled end-time based on the received message. In another example, the server can transmit an indication of a predicted timing attribute or other related data to the receiver 210, which can receive and use this information to predict that the distribution of the first media program on the channel will end later than the scheduled end-time.

Responsive at least to the predicting, the receiver 210 can (i) retrieve from a source other than the channel, a portion (e.g., some or all) of the second media program, and (ii) after the scheduled start-time, the receiver 210 can output the retrieved portion of the second media program. As with the first source 202 and the first distributor 204, the second source 206 can also transmit media content to the second distributor 208, which can transmit the media content to the receiver 210. As such, in one example, the second distributor 208 can be the source other than the channel. In the case where the first distributor 204 is a broadcast-based distributor and second distributor 208 is an Internet service provider, this can allow the receiver 210 to retrieve the portion of the second media program "over the top" of the broadcast first media program.

In some instances, the receiver 210 can extract data from the distribution schedule, and can use the extracted data to identify the second media program, thus facilitating the receiver 210 retrieving the portion of the second media program from the second distributor 208.

In some cases, the receiver 210 can receive the portion of the first media program via a first communication interface of the receiver 210, and can retrieve the portion of the second media program via a second communication interface of the receiver 210 that is different from the first communication interface. For instance, where the first distributor 204 is a broadcast-based distributor and second distributor 208 is an Internet service provider, the first communication interface of the receiver 210 can be a coaxial or other interface configured to receive the portion of first media content via a broadcast-based distribution system, and the second communication interface of the receiver 210 can be an Ethernet or other interface configured to receive the portion of second media content via a multicast-based or unicast-based distribution system.

In some cases, such as where second media program is prerecorded, the receiver 210 can retrieve or can begin retrieving the portion of the second media program from the second source 206 before its scheduled start-time. In other cases, such as where the second media program is scheduled to be provided as a live broadcast, the receiver 210 can retrieve and output the portion of the second media program while retrieving the portion of the second media program. In still other examples, the receiver 210 can retrieve or can begin retrieving the portion of the second media program from the second distributor 208 after its scheduled start-time.

The receiver 210 can output the retrieved portion of the second media program in various ways. For example, the receiver 210 can output the retrieved portion of the second media program by transmitting the retrieved portion of the second media program to the media presentation device 212, which can receive and present the retrieved portion to the end-user.

Recall the scenario discussed above where the end-user may become frustrated when the media presentation device 212 presents the ten minutes overrun portion of the first media program instead of the first ten minutes of the second media program. As shown with the features discussed above, the media system 200 can address this issue by allowing the end-user to watch the first ten minutes of the second media program despite the first distributor 204 distributing a portion of the first media program beyond its scheduled end-time. As such, the receiver 210 outputting the retrieved portion of the second media program can include the receiver 210 switching from outputting the received portion of the first media program to outputting the retrieved portion of the second media program. Then, at a later time, (e.g., after the scheduled end-time of the second media program) the receiver 210 can switch back to presenting media content received from the first distributor 204.

Given that some end-users may wish to watch the overrun portion of the first media program, whereas other end-users may instead wish to watch the beginning of the second media program, the receiver 210 can allow the end-user to choose which of the two media programs to output when such a timing conflict exists. For example, proximate to the scheduled end-time of the first media program, the receiver 210 can output two selectable user-interface objects, a first of which corresponds with the first media program, and a second of which corresponds with the second media program. In this way, the end-user can select (e.g., using a remote control device) one of the objects to indicate which of the two media programs the end-user wishes to watch. In one example, the receiver 210 can detect a selection of the first selectable user-interface object, in which case the receiver 210 can continue outputting the first media program. However, in another example, the receiver 210 can detect a selection of the second selectable user-interface object, and responsive to at least the detecting, the receiver can switch from outputting the received portion of the first media program to outputting the retrieved portion of the second media program.

In one example, the receiver 210 can output the selectable user-interface objects proximate to the scheduled end-time. This can prompt the end-user and give the end-user an opportunity to switch from watching the first media program to watching the second media program at a desirable time.

In other examples, the receiver 210 can allow the end-user to set default preferences though a settings menu of the like to handle such timing conflicts. For example, the receiver 210 can allow the end-user to specify priority rankings for various media programs or types of media programs (e.g., sporting events) to allow the receiver 210 to resolve the types of conflicts described above in an automated manner.

Although some of the acts and/or functions described in this disclosure have been described as being performed by a particular entity, the acts and/or functions can be performed by any entity, such as those entities described in this disclosure. For example, the media presentation device 212 can perform one or more of the acts and/or functions described as being performed by the receiver 210. Other arrangements are possible as well. For example, rather than the first source 202 providing the first media content to the receiver 210 via the first distributor 204, the first source 202 can provide the first media content directly to the media presentation device 212. Likewise, rather than the second source 206 providing the second media content to the receiver 210 via the second distributor 208, the second source 206 can provide the second media content directly to the media presentation device 212.

Further, rather than the first source 202 and/or the first distributor 204 providing the first media content to the media presentation device 212 via the receiver 210, the first source 202 and/or the first distributor 204 can provide the first media content to the media presentation device 212 directly. Likewise, rather than the second source 206 and/or the second distributor 208 providing the second media content to the media presentation device 212 via the receiver 210, the second source 206 and/or the second distributor 208 can provide the second media content to the media presentation device 212 directly. Various other arrangements are possible as well.

FIG. 3 is a flow chart illustrating an example method 300.

At block 302, the method 300 can include receiving, by a computing system, a portion of a first media program being distributed on a channel, wherein the distribution of the first media program on the channel is scheduled to end at an end-time, and wherein a distribution of a second media program on the channel is scheduled to start at a start-time that corresponds with the scheduled end-time.

At block 304, the method 300 can include predicting, by the computing system, that the distribution of the first media program on the channel will end later than the scheduled end-time.

At block 306, the method 300 can include responsive at least to the predicting, (i) retrieving, by the computing system, from a source other than the channel, a portion of the second media program, and (ii) after the scheduled start-time, outputting, by the computing system, the retrieved portion of the second media program.

IV. Example Variations

Although some of the acts and/or functions described in this disclosure have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A system comprising:
   a first distributor to distribute a portion of first media on a channel from a first media source, wherein the first media is scheduled to end at a scheduled end-time;
   a receiver to determine a predicted end-time for the first media, the predicted end-time indicating that the distribution of the first media on the channel will end after the scheduled end-time, the determining including:
      obtaining data representing a first state of the first media;
      obtaining data representing a second state of a past event corresponding to a subject of the first media; and
      determining the predicted end-time based on a comparison of the first state and the second state; and
   a second distributor different from the first distributor to:
      distribute a portion of second media from a second media source other than the channel when the predicted end-time is after the scheduled end-time wherein the second media is to start at a scheduled start-time; and
      cause the receiver to output the portion of the second media after the scheduled start-time.

2. The system of claim 1, further including:
   a first connection mechanism;
   a second connection mechanism;
   a first media content source to deliver the first media to the first distributor via the first connection mechanism; and a second media content source to deliver the second media to the second distributor via the second connection mechanism.

3. The system of claim 2, wherein at least one of the first connection mechanism or the second connection mechanism is a cable, a system bus, a packet-based communication network, or a non-tangible medium.

4. The system of claim 2, wherein at least one of the first media content source or the second media content source is at least one of a broadcaster or a web server.

5. The system of claim 1, wherein the first distributor is to distribute the first media based on a first distribution schedule and the second distributor is to distribute the second media based on a second distribution schedule.

6. The system of claim 1, wherein the receiver is at least one of a cable receiver, a satellite receiver, an over-the-air broadcast receiver, or a streaming media receiver.

7. The system of claim 1, wherein the receiver is to deliver the first media and the second media to a media presentation device, the media presentation device is a display device or an audio device.

8. The system of claim 7, wherein the display device is a television and the audio device is a loudspeaker.

9. The system of claim 1, wherein at least one of the first distributor or the second distributor is at least one of a multi-channel distributor or an Internet service provider.

10. The system of claim 9, wherein the multi-channel distributor is at least one of a local content provider, a cable provider, a satellite provider, an over-the-air broadcast provider, or a web aggregator.

11. A system comprising:
    at least one processor; and
    memory including instructions that, when executed, cause the at least one processor to at least:
       distribute a portion of first media on a channel from a first media source to a receiver, wherein the first media is scheduled to end at a scheduled end-time;
       obtain data representing a first state of the first media;
       obtain data representing a second state of a past event corresponding to a subject of the first media;
       determine a predicted end-time for the first media based on a comparison of the first state and the second state, the predicted end-time indicating that the distribution of the first media on the channel will end after the scheduled end-time;
       distribute a portion of second media from a second media source other than the channel to the receiver when the predicted end-time is after the scheduled end-time wherein the second media is to start at a scheduled start-time; and
       cause the receiver to output the portion of the second media after the scheduled start-time.

12. The system of claim 11, wherein the at least one processor is to output the portion of the second media by transmitting the portion of the second media to a media presentation device for presentation while obtaining the portion of the second media.

13. The system of claim 11, wherein the at least one processor is to obtain the portion of the first media from a first distributor and the portion of the second media from a second distributor different from the first distributor.

14. The system of claim 13, wherein the first distributor is a broadcast-based distribution system and the second distributor is a multicast-based distribution system or a unicast-based distribution system.

15. The system of claim 11, further including:
    a first communication interface to obtain the portion of the first media; and
    a second communication interface to obtain the portion of the second media, the second communication interface different from the first communication interface; and
    the at least one processor is to output the portion of the second media by switching from outputting the portion of the first media to outputting the portion of the second media.

16. The system of claim 11, wherein the at least one processor is to determine that the predicted end-time is after the scheduled end-time by:
    determining the scheduled end-time using a distribution schedule;
    comparing the scheduled end-time to the predicted end-time; and
    determining that the predicted end-time is later than the scheduled end-time based on the comparison.

17. The system of claim 11, wherein the at least one processor is to:
    output a selectable user-interface object;
    detect a selection of the selectable user-interface object; and switch from outputting the portion of the first media to the portion of the second media when the selection is detected.

18. A storage disc or storage device comprising instructions that, when executed, cause at least one processor to at least:
- distribute a portion of first media on a channel from a first media source to a receiver, wherein the first media is scheduled to end at a scheduled end-time;
- obtain data representing a first state of the first media;
- obtain data representing a second state of a past event corresponding to a subject of the first media;
- determine a predicted end-time for the first media based on a comparison of the first state and the second state, the predicted end-time indicating that the distribution of the first media on the channel will end after the scheduled end-time;
- distribute a portion of second media from a second media source other than the channel to the receiver when the predicted end-time is after the scheduled end-time wherein the second media is to start at a scheduled start-time; and
- cause the receiver to output the portion of the second media after the scheduled start-time.

19. The storage disc or storage device of claim 18, wherein the instructions, when executed, cause the at least one processor to determine that the predicted end-time is after the scheduled end-time by:
- determining the scheduled end-time using a distribution schedule;
- comparing the scheduled end-time to the predicted end-time; and
- determining that the predicted end-time is later than the scheduled end-time based on the comparison.

20. The storage disc or storage device of claim 18, wherein the instructions, when executed, cause the at least one processor to:
- output a selectable user-interface object;
- detect a selection of the selectable user-interface object; and
- switch from outputting the portion of the first media to the portion of the second media when the selection is detected.

* * * * *